(12) United States Patent
Aoki et al.

(10) Patent No.: US 10,949,656 B2
(45) Date of Patent: Mar. 16, 2021

(54) INFORMATION PROCESSING APPARATUS AND INFORMATION PROCESSING METHOD

(71) Applicant: SONY CORPORATION, Tokyo (JP)

(72) Inventors: Suguru Aoki, Tokyo (JP); Taketo Akama, Tokyo (JP); Hideki Oyaizu, Tokyo (JP); Yasutaka Hirasawa, Tokyo (JP); Yuhi Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 358 days.

(21) Appl. No.: 15/760,380

(22) PCT Filed: Aug. 25, 2016

(86) PCT No.: PCT/JP2016/003877
§ 371 (c)(1),
(2) Date: Mar. 15, 2018

(87) PCT Pub. No.: WO2017/056382
PCT Pub. Date: Apr. 6, 2017

(65) Prior Publication Data
US 2018/0253595 A1    Sep. 6, 2018

(30) Foreign Application Priority Data

Sep. 29, 2015  (JP) .............................. JP2015-191187

(51) Int. Cl.
*G06K 9/00*    (2006.01)
*G06T 7/60*    (2017.01)
(Continued)

(52) U.S. Cl.
CPC ..... *G06K 9/00335* (2013.01); *G06K 9/00342* (2013.01); *G06K 9/00348* (2013.01);
(Continued)

(58) Field of Classification Search
CPC ............. B60W 50/14; B60W 30/0956; B60W 2050/146; B60W 2554/00; G06K 9/00348;
(Continued)

(56) References Cited

U.S. PATENT DOCUMENTS

| | | | |
|---|---|---|---|
| 7,038,577 B2* | 5/2006 | Pawlicki | B60Q 1/525 340/435 |
| 2007/0222566 A1* | 9/2007 | Tsuji | G06K 9/00791 340/435 |

(Continued)

FOREIGN PATENT DOCUMENTS

| | | |
|---|---|---|
| CN | 103250196 A | 8/2013 |
| CN | 103827938 A | 5/2014 |

(Continued)

OTHER PUBLICATIONS

International Search Report and Written Opinion of PCT Application No. PCT/JP2016/003877, dated Nov. 29, 2016, 12 pages.

(Continued)

*Primary Examiner* — Pinalben Patel
(74) *Attorney, Agent, or Firm* — Chip Law Group

(57) ABSTRACT

An information processing apparatus according to an embodiment of the present technology includes a detection unit, an estimation unit, and a prediction unit. The detection unit detects a target object from an input image. The estimation unit estimates a posture of the detected target object. The prediction unit predicts an action of the target object on a basis of the estimated posture.

15 Claims, 11 Drawing Sheets

(51) Int. Cl.
*G08G 1/16* (2006.01)
*G06T 7/246* (2017.01)
*B60W 50/14* (2020.01)

(52) U.S. Cl.
CPC .......... *G06K 9/00805* (2013.01); *G06T 7/246* (2017.01); *G06T 7/60* (2013.01); *G08G 1/16* (2013.01); *G08G 1/166* (2013.01); *B60W 50/14* (2013.01); *G06K 9/00369* (2013.01)

(58) Field of Classification Search
CPC .......... G06K 9/00805; G06K 9/00369; G06K 9/00342; G06K 9/00335; G06T 7/246; G06T 7/60; G08G 1/166; G08G 1/16
See application file for complete search history.

(56) References Cited

U.S. PATENT DOCUMENTS

| | | | |
|---|---|---|---|
| 2013/0293395 A1 | 11/2013 | Ohama et al. | |
| 2014/0112538 A1 | 4/2014 | Ogawa et al. | |
| 2014/0236386 A1 | 8/2014 | Yoshizawa et al. | |
| 2016/0357188 A1* | 12/2016 | Ansari | G06K 9/00805 |

FOREIGN PATENT DOCUMENTS

| | | | | |
|---|---|---|---|---|
| CN | 103886287 | A | 6/2014 | |
| CN | 103907146 | A | 7/2014 | |
| CN | 104680124 | A | 6/2015 | |
| CN | 104842360 | A | 8/2015 | |
| DE | 102007014012 | A | 10/2007 | |
| DE | 102013207575 | A1 | 10/2013 | |
| EP | 2648172 | A1 | 10/2013 | |
| EP | 2759996 | A1 | 7/2014 | |
| JP | 2007-279808 | A | 10/2007 | |
| JP | 2009-122854 | A | 6/2009 | |
| JP | 2010-165003 | A | 7/2010 | |
| JP | 2012-118741 | A | 6/2012 | |
| JP | 2012-226437 | A | 11/2012 | |
| JP | 2013002884 | A * | 1/2013 | |
| JP | 5251800 | B2 * | 7/2013 | |
| JP | 2013-232080 | A | 11/2013 | |
| JP | 2014-052883 | A | 3/2014 | |
| JP | 2014-067269 | A | 4/2014 | |
| KR | 10-2013-0103779 | A | 9/2013 | |
| KR | 20180114723 | A * | 10/2018 | ........ B60W 30/0956 |
| RU | 2014115984 | A | 10/2015 | |
| WO | 2011026316 | A1 | 3/2011 | |
| WO | 2012/073745 | A1 | 6/2012 | |
| WO | 2012/172629 | A1 | 12/2012 | |
| WO | 2013/042260 | A1 | 3/2013 | |
| WO | 2016/092650 | A1 | 6/2016 | |
| WO | 2016/098238 | A1 | 6/2016 | |

OTHER PUBLICATIONS

Office Action for Chinese Patent Application No. 201680055031.4 dated Jul. 2, 2020.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/003877 filed on Aug. 25, 2016, which claims priority benefit of Japanese Patent Application No. JP 2015-191187 filed in the Japan Patent Office on Sep. 29, 2015. Each of the above-referenced applications is hereby incorporated herein by reference in its entirety.

TECHNICAL FIELD

The present technology relates to an information processing apparatus, an information processing method, and a program for raising caution of a driver when driving an automobile or the like, for example.

BACKGROUND ART

Accident avoidance technologies at emergencies, such as an automatic emergency brake and a collision avoidance system, are becoming common. Further, systems that raise caution of drivers and the like for avoiding accidents have also been developed. For example, in Patent Literature 1, a judgment is made on whether a bicycle traveling in front of own vehicle is apt to fall over on the basis of weather information and road information read out from a database. In a case where the bicycle in front is apt to fall over, a warning to that effect is made to a driver (paragraphs [0043] to [0049] etc. in specification of Patent Literature 1).

In addition, in Patent Literature 2, a judgment is made on whether a pedestrian is present in an area where own vehicle travels by analyzing an image ahead of the vehicle, that has been photographed by an infrared camera. Also by detecting movements of pedestrians outside the traveling area, a danger level of a pedestrian entering the traveling area is judged. A warning sound with a narrow directivity is output to a pedestrian in an area or a pedestrian of a high danger level (paragraphs [0051], [0052], [0068], etc. in specification of Patent Literature 2).

CITATION LIST

Patent Literature

Patent Literature 1: Japanese Patent Application Laid-open No. 2009-122854
Patent Literature 2: Japanese Patent Application Laid-open No. 2014-52883

DISCLOSURE OF INVENTION

Technical Problem

As described above, there is a demand for a technology capable of raising caution of a driver and the like by providing effective information for preventing an accident or the like from occurring.

In view of the circumstances as described above, the present technology aims at providing an information processing apparatus, an information processing method, and a program that are capable of providing effective information so as to raise caution.

Solution to Problem

To attain the object described above, an information processing apparatus according to an embodiment of the present technology includes a detection unit, an estimation unit, and a prediction unit.

The detection unit detects a target object from an input image.

The estimation unit estimates a posture of the detected target object.

The prediction unit predicts an action of the target object on a basis of the estimated posture.

In this information processing apparatus, the action of the target object can be predicted highly accurately on the basis of the estimated posture. As a result, it becomes possible to provide effective information for preventing an accident or the like from occurring to a driver and the like so as to raise caution.

The detection unit may be capable of detecting a pedestrian from the input image. In this case, the prediction unit may predict an action of the pedestrian on a basis of an estimated posture of the pedestrian.

Accordingly, it becomes possible to prevent an accidental contact with a pedestrian, for example, or the like from occurring.

The detection unit may be capable of detecting a two-wheeled vehicle and a rider thereof from the input image. In this case, the estimation unit may estimate at least a posture of the rider. Further, the prediction unit may predict an action of the two-wheeled vehicle and the rider thereof on a basis of the estimated posture of the rider.

Accordingly, it becomes possible to prevent an accidental contact with a two-wheeled vehicle, for example, or the like from occurring.

The estimation unit may estimate a posture of the two-wheeled vehicle. In this case, the prediction unit may predict the action of the two-wheeled vehicle and the rider thereof on a basis of the estimated posture of each of the two-wheeled vehicle and the rider thereof.

Accordingly, the actions of the two-wheeled vehicle and the rider thereof can be predicted highly accurately.

The prediction unit may calculate a feature point related to the target object on a basis of the estimated posture, and predict the action of the target object on a basis of a position of the calculated feature point.

Accordingly, the action of the target object can be predicted easily.

The feature point may be a barycenter point of the target object.

By using a position of the barycenter point, the action of the target object can be predicted highly accurately.

The detection unit may be capable of detecting a two-wheeled vehicle and a rider thereof from the input image. In this case, the prediction unit may calculate, as the feature point, a barycenter point of the rider or an overall barycenter point of the two-wheeled vehicle and the rider thereof.

The prediction unit may calculate one or more contact points of the target object with a road surface on a basis of the estimated posture, and predict the action on a basis of a relative positional relationship between the feature point and the one or more contact points.

Accordingly, the action of the target object can be predicted highly accurately.

The prediction unit may predict a movement direction of the target object.

Accordingly, an accidental contact with the target object, and the like can be prevented from occurring.

The prediction unit may predict an abrupt acceleration of the target object.

Accordingly, an accidental contact with the target object, and the like can be prevented from occurring.

The estimation unit may estimate a framework of the detected target object.

Accordingly, the posture of the target object can be estimated highly accurately.

The information processing apparatus may be mounted on a mobile object apparatus, and the information processing apparatus may further include an output unit that generates and outputs danger avoidance information for avoiding a danger related to a drive of the mobile object apparatus on a basis of the predicted action of the target object.

Accordingly, it becomes possible to raise caution of a driver of the mobile object apparatus and prevent an accidental contact with a pedestrian and the like from occurring.

The output unit may judge a possibility of the mobile object apparatus and the target object coming into contact with each other, and output information on the judged possibility.

Accordingly, it becomes possible to raise caution of the driver and prevent an accidental contact with a pedestrian and the like from occurring.

The prediction unit may be capable of predicting a movement direction of the target object. In this case, the output unit may output an image including the predicted movement direction.

Accordingly, it becomes possible to raise caution against a pedestrian or the like approaching a path of the mobile object apparatus, for example, and prevent an accidental contact or the like from occurring.

The output unit may output an image including a dangerous area where there is a possibility that the mobile object apparatus and the target object will come into contact with each other.

Accordingly, it becomes possible for the driver to easily grasp a safe path and the like, for example.

An information processing method according to an embodiment of the present technology is an information processing method executed by a computer, the method including detecting a target object from an input image.

A posture of the detected target object is estimated.

An action of the target object is predicted on a basis of the estimated posture.

A program according to an embodiment of the present technology causes a computer to execute the following steps.

The step of detecting a target object from an input image.

The step of estimating a posture of the detected target object.

The step of predicting an action of the target object on a basis of the estimated posture.

Advantageous Effects of Invention

As described above, according to the present technology, it becomes possible to provide effective information to raise caution. It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

First Embodiment

[Configuration of Automobile]

Figure 1:
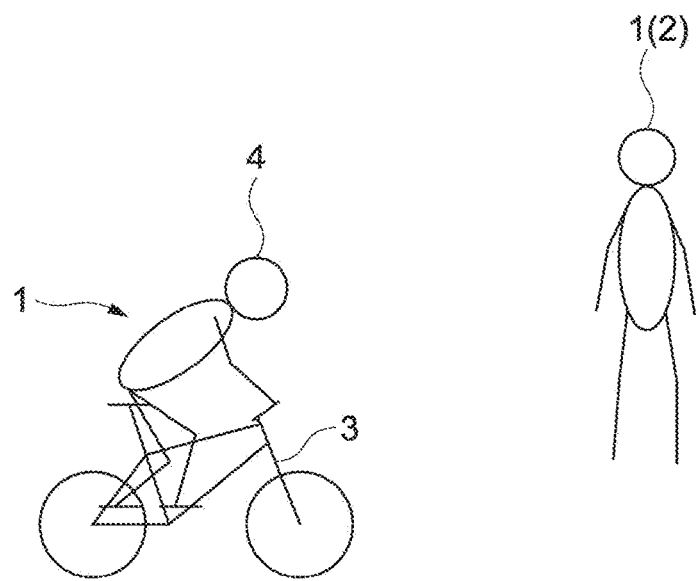
FIG. 1 An outer appearance diagram showing a configuration example of an automobile as an example of a mobile object apparatus on which a danger avoidance apparatus according to a first embodiment is mounted.
Figure 1:
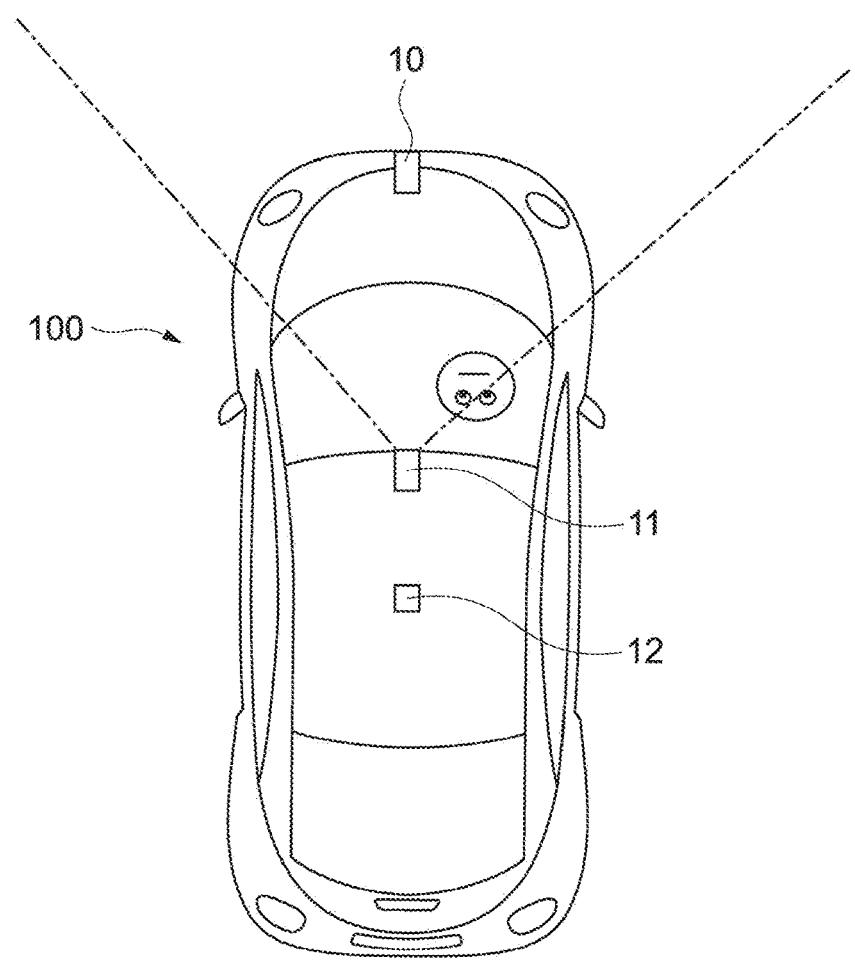
Figure 2:
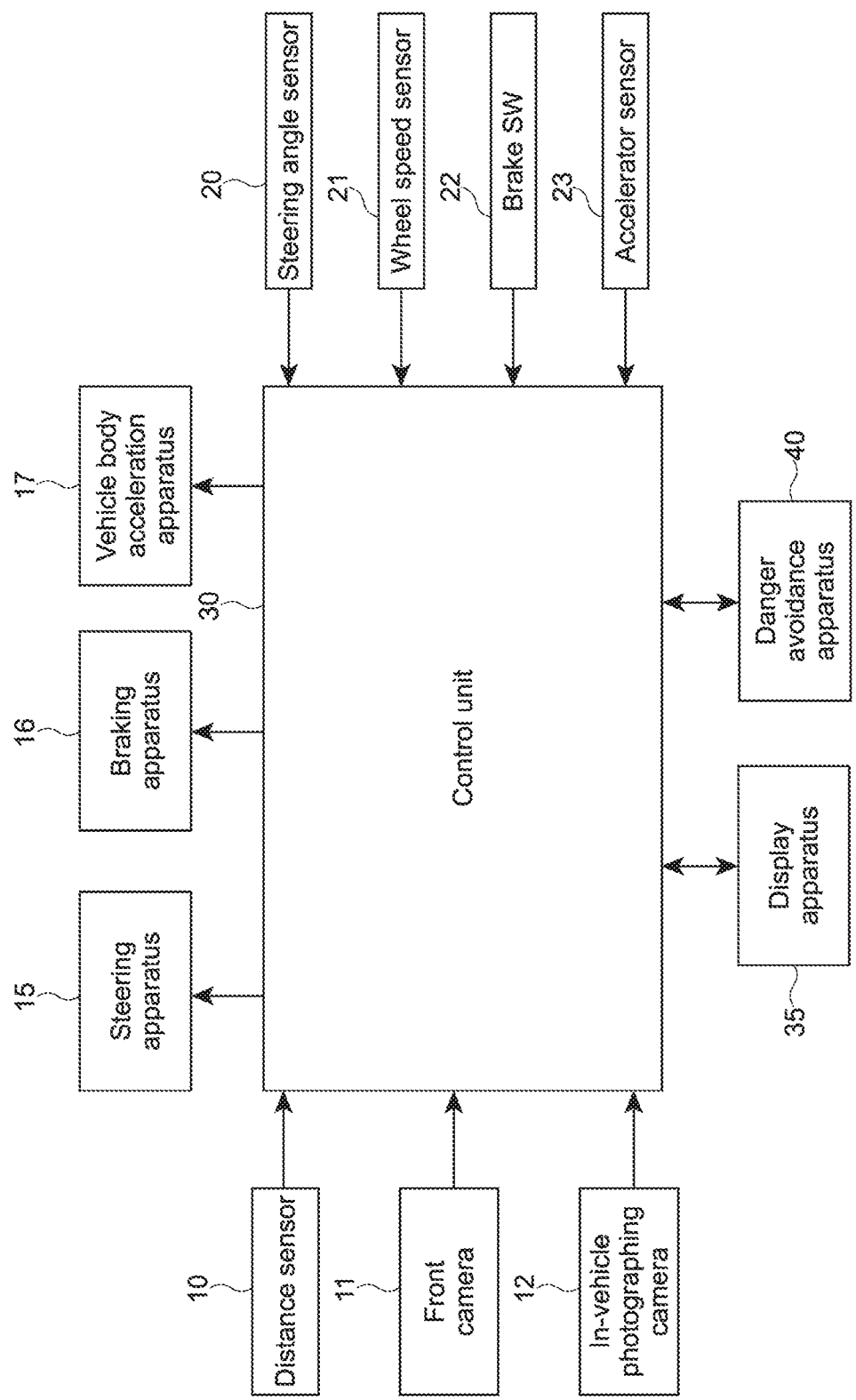
FIG. 2 A block diagram showing a configuration example of the automobile shown in FIG. 1.

FIG. 1 is an outer appearance diagram showing a configuration example of an automobile as an example of a mobile object apparatus on which a danger avoidance apparatus according to a first embodiment of the present technology is mounted. FIG. 2 is a block diagram thereof.

As shown in FIG. 1, an automobile 100 includes a distance sensor 10, a front camera 11, and an in-vehicle photographing camera 12. Further, as shown in FIG. 2, the automobile 100 includes a steering apparatus 15, a braking apparatus 16, a vehicle body acceleration apparatus 17, a steering angle sensor 20, a wheel speed sensor 21, a brake switch 22, an accelerator sensor 23, a control unit 30, a display apparatus 35, and a danger avoidance apparatus 40.

For example, the distance sensor 10 is provided at substantially the center of a front portion of the automobile 100, and detects information on a distance between the automobile 100 and an object present in a movement direction thereof. The distance sensor 10 includes various sensors that use a millimeter wave radar, infrared laser, and the like, for example.

The front camera 11 is provided in a cabin or roof portion of the automobile 100, for example, and photographs a front view of the automobile 100 at a predetermined frame rate. The photographed image photographed by the front camera 11 is output to the danger avoidance apparatus 40 via the control unit 30, and a movement of a target object present in front of own vehicle is predicted. For example, the front camera 11 includes an image sensor that uses a CMOS, a CCD, or the like.

As shown in FIG. 1, in this embodiment, a pedestrian 2, a bicycle 3, and a rider 4 thereof will be exemplified as the target object 1. In addition, the present technology is also applicable to riders of other two-wheeled vehicles such as a motorcycle, an auto three-wheeled vehicle, and the like.

The in-vehicle photographing camera 12 is provided in the cabin of the automobile 100 and photographs an inside of the cabin at a predetermined frame rate. A presence or absence of a passenger, a sitting position thereof, and the like, for example, can be judged by the image photographed by the in-vehicle photographing camera 12.

It should be noted that the distance sensor 10, the front camera 11, and the in-vehicle photographing camera 12 may be configured such that outputs thereof are supplied to the danger avoidance apparatus 40 instead of the control unit 30 as shown in FIG. 2.

The steering apparatus 15 is typically constituted of a power steering apparatus and transmits a steering operation of the driver to steered wheels. The braking apparatus 16 includes a brake actuator attached to each wheel and a hydraulic circuit for actuating the brake actuators, and controls a braking force of each of the wheels. The vehicle body acceleration apparatus 17 includes a throttle valve, a fuel injection apparatus, and the like, and controls a rotational acceleration of drive wheels.

The control unit 30 controls operations of the respective mechanisms mounted on the automobile 100. For example, the control unit 30 controls brake, steering, acceleration, and the like of the automobile 100 on the basis of operations of the driver using a steering wheel, an accelerator, and the like. For example, the control unit 30 detects a steering amount and a steering direction on the basis of an output of the steering angle sensor 20 that detects a steering operation of the driver, to thus control the steering apparatus 15.

Further, the control unit 30 calculates a vehicle body speed of the vehicle on the basis of an output of the wheel speed sensor 21 provided on all the wheels or a part of the wheels, and controls the braking apparatus 16 such that locking (slipping) of the wheels is prevented from occurring. Furthermore, the control unit 30 controls the vehicle body acceleration apparatus 17 on the basis of an output of the accelerator sensor 23 that detects an accelerator pedal operation amount of the driver.

The brake switch 22 is used for detecting a brake operation (depression of brake pedal) of the driver and is referenced in performing ABS control or the like.

The control unit 30 may control the steering apparatus 15, the braking apparatus 16, and the vehicle body acceleration apparatus 17 individually, as well as cooperatively control a plurality of them. As a result, it becomes possible to control the automobile 100 to a desired posture during steering (turning), braking, acceleration, and the like.

Further, the control unit 30 is configured to be capable of controlling the steering apparatus 15, the braking apparatus 16, and the vehicle body acceleration apparatus 17 irrespective of the various operations of the driver described above. For example, the automobile 100 may include an automatic driving function. In this case, the control unit 30 subjectively controls the respective apparatuses on the basis of the outputs of the respective sensors and cameras.

The display apparatus 35 includes a display unit that uses liquid crystal, EL (Electro-Luminescence), or the like, for example, and displays map information, navigation information, and the like on the display unit. Further, the display apparatus 35 displays a danger avoidance image output from the danger avoidance apparatus 35. Typically, a car navigation apparatus is used as the display apparatus 35. Further, an apparatus that causes an AR (Augmented Reality) image to be displayed at a predetermined position of a windshield or the like may also be used.

As will be described later in detail, the danger avoidance apparatus 40 detects the target object 1 from an image photographed by the front camera 11 and predicts an action of the target object 1. In other words, the next action of the target object 1 that may be made in the future since the photographed timepoint is predicted. For example, a movement direction of the target object 1, presence or absence of an abrupt acceleration, and the like can be predicted.

The danger avoidance apparatus 40 corresponds to an information processing apparatus according to this embodiment and includes hardware requisite for a computer, such as a CPU, a RAM, and a ROM, for example. A danger avoidance method (information processing method) according to the present technology is executed by the CPU loading a program according to the present technology, that is recorded in advance in the ROM, to the RAM and executing it.

A specific configuration of the danger avoidance apparatus 40 is not limited, and PLD (Programmable Logic Device) such as FPGA (Field Programmable Gate Array) and other devices such as ASIC (Application Specific Integrated Circuit) may also be used. Further, the danger avoidance apparatus 40 may be configured as a part of the control unit 30.

Figure 3:
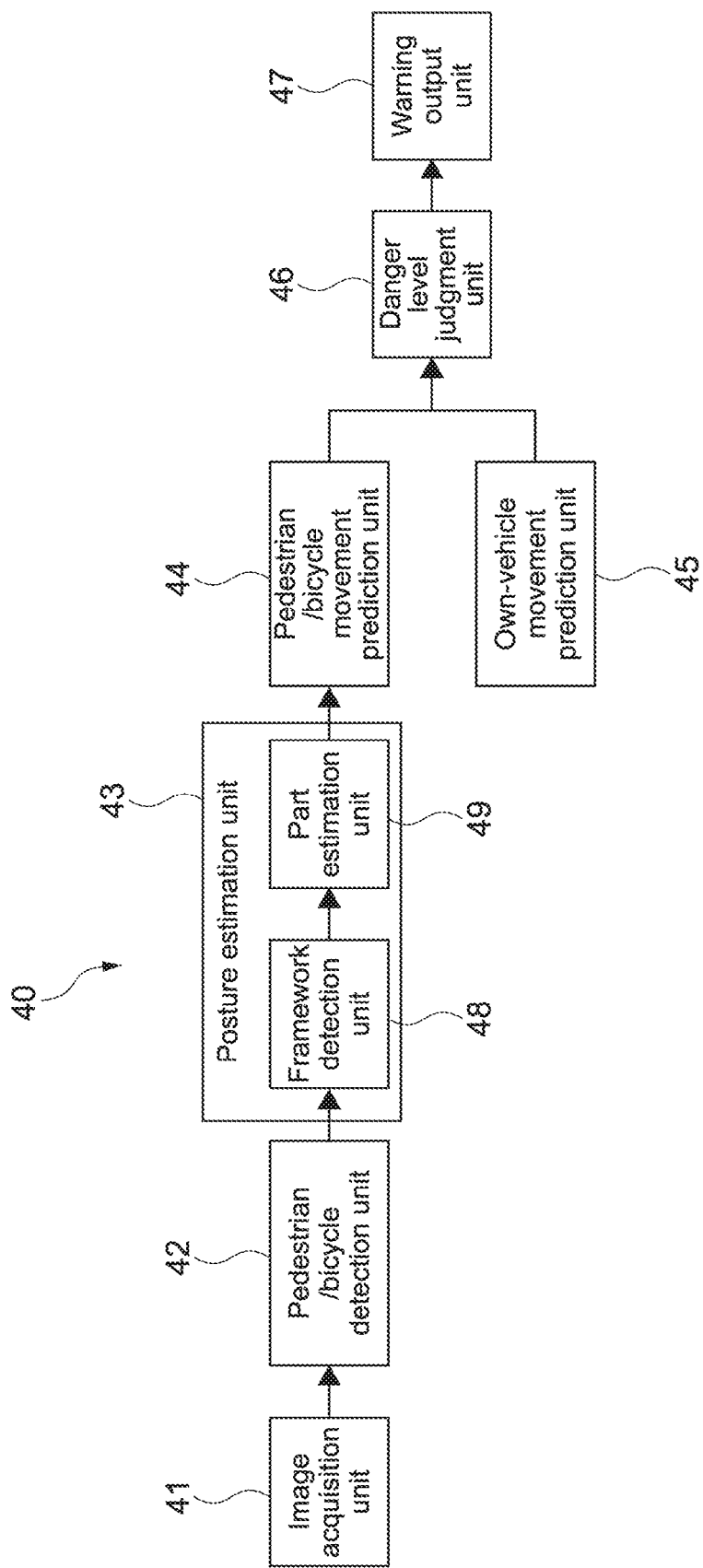
FIG. 3 A block diagram showing a functional configuration example of the danger avoidance apparatus.

FIG. 3 is a block diagram showing a functional configuration example of the danger avoidance apparatus 40. The danger avoidance apparatus 40 includes an image acquisition unit 41, an object detection unit 42, a posture estimation unit 43, an object movement prediction unit 44, an own-vehicle movement prediction unit 45, a danger level judgment unit 46, and a warning output unit 47. For example, the CPU of the danger avoidance apparatus 40 executes a predetermined program so as to configure each of the functional blocks.

The image acquisition unit 41 acquires an image photographed by the front camera 11 (hereinafter, this image will be referred to as input image). The object detection unit 42 detects each of the pedestrian 2, the bicycle 3, and the rider 4 thereof from the input image. The detection of the pedestrian 2 and the bicycle 3 may be performed by an arbitrary image analysis technology such as template matching and image scanning.

The posture estimation unit 43 estimates postures of the detected pedestrian 2 and the rider 4. The posture estimation unit 43 includes a part estimation unit 48 and a framework detection unit 49. In other words, in this embodiment, the postures are judged on the basis of framework positions of the pedestrian 2 and the rider 4.

Figure 4:
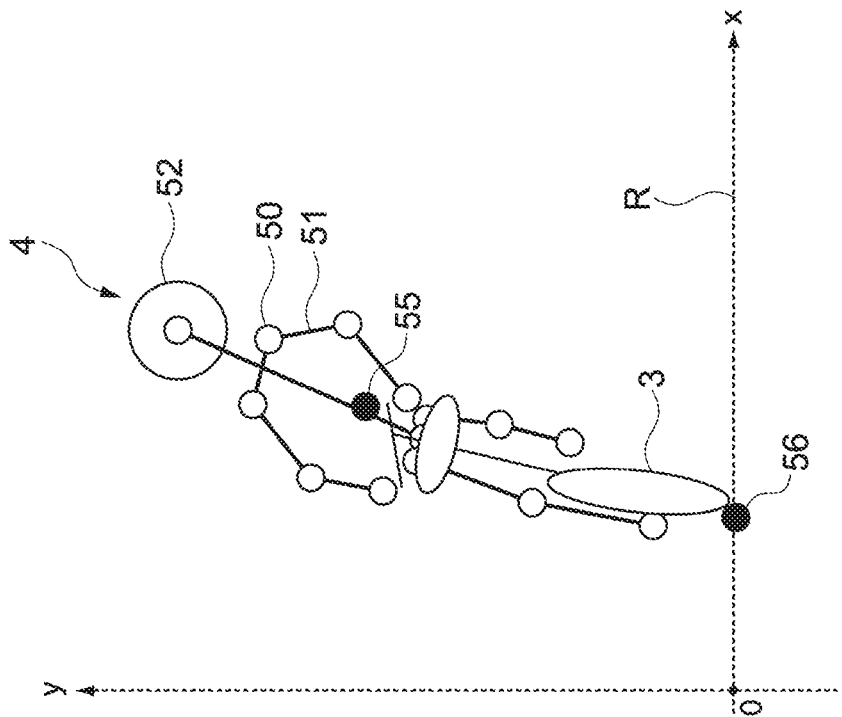
FIG. 4 A diagram for explaining an example of a framework estimation.
Figure 4:
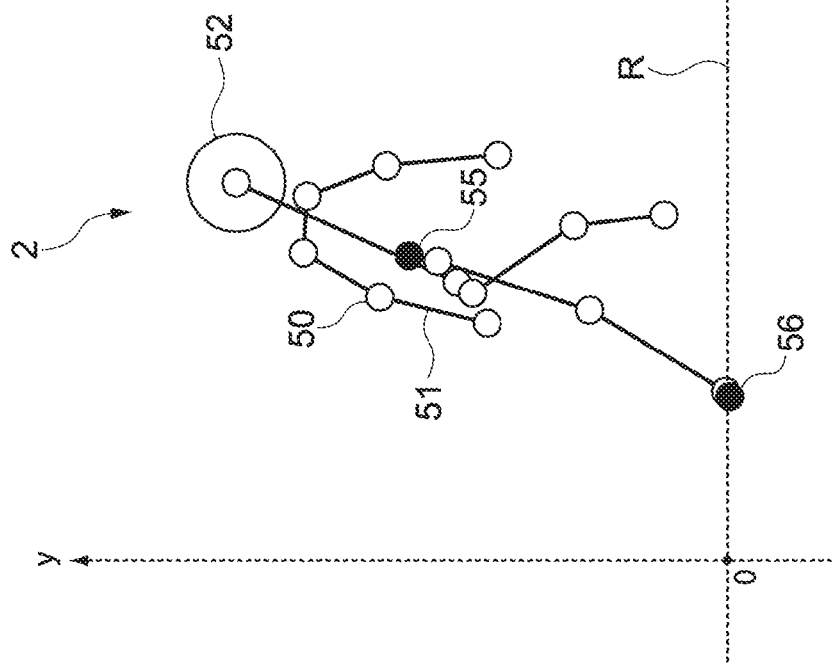

FIG. 4 is a diagram for explaining an example of the framework estimation. The framework of each of the pedestrian 2 and the rider 4 is expressed by white circles 50, lines 51 connecting them, and a head portion 52 in FIG. 4. In FIG. 4, a barycenter point 55 of each of the pedestrian 2 and the rider 4, grounding points 56 of the pedestrian 2 and bicycle 3 with a road surface R, and xy coordinate systems are shown. These are used for predicting the next action of the pedestrian 2 and the like.

The framework estimation is also called bone estimation or skeleton estimation and can be executed using a well-known technology. Describing an example thereof with reference to the pedestrian 2, first, a model of a framework to be calculated, that is, a model of the positions and number of white circles 50, the lines 51 connecting them, and the like shown in FIG. 4 are preset.

The framework model is typically set in accordance with an actual framework of a human body. For example, a plurality of main parts such as a head, thigh, and waist are set, and the white circles 50 are set at barycenter points of the parts and joint portions of the parts. Further, the lines 51 connecting the white circles 50 are set on the basis of the positions of the parts.

On the basis of the image (partial image) of the pedestrian 2 in the input image, the part estimation unit 48 calculates the position of each part set as described above with respect to the pedestrian 2 in the input image. For example, images of each part in various postures are stored as template images. By matching these template images with the image of the pedestrian 2, the position of each part of the pedestrian 2 can be calculated.

The framework detection unit 49 sets the white circles 50, the lines 51, and the head portion 52 on the basis of the calculated position of each part, and thus the framework of the pedestrian 2 is detected.

It should be noted that it is also possible to mount a depth sensor on a front portion of the automobile 100 and estimate the position of each part using parameters obtained by machine learning on the basis of a depth image (distance image) of the pedestrian 2 obtained by the depth sensor. For example, one pixel in the image of the pedestrian 2 is selected, and depth information (distance information) of a predetermined area including the pixel is acquired. On the basis of this depth information, a judgment is made on which part the selected pixel is included in using the parameters described above. By executing the same processing for each pixel in the image of the pedestrian 2, the position of each part of the pedestrian 2 can be calculated. Accordingly, the framework of the pedestrian 2 is estimated.

Instead of the depth information, RGB information of a pixel may be used. Specifically, it is possible to judge a part including a selected pixel using parameters obtained by machine learning on the basis of peripheral RGB information of the selected pixel. In addition, the framework estimation may be executed by an arbitrary technology such as a method that uses a stereo camera. It should be noted that the framework of the rider 4 of the bicycle 3 can also be similarly estimated.

The object movement prediction unit 44 predicts actions of the pedestrian 2 and the rider 4 of the bicycle 3 from the estimated postures, that is, the frameworks shown in FIG. 4. It should be noted that in a case where the bicycle 3 and the rider 4 thereof are detected as the target object 1, the actions of the bicycle 3 and the rider 4 thereof are predicted on the basis of the postures of the bicycle 3 and the rider 4 thereof.

Here, the postures of the bicycle 3 and the rider 4 thereof can be estimated on the basis of, for example, either the posture of the rider 4 or the posture of the bicycle 3, or both of them. Further, the next action of the bicycle 3 and the rider 4 thereof includes both an action of the rider 4 such as a steering operation and a pedal operation and an action of the bicycle 3 such as moving straight, curving, and sudden acceleration. Hereinafter, the postures and actions of the bicycle 3 and the rider 4 thereof may be described while merely referring to only the rider 4 or the bicycle 3, such as a posture of the rider 4 and an action of the bicycle 3.

The own-vehicle movement prediction unit 45 predicts the next action of the automobile 100. Typically, the own-vehicle movement prediction unit 45 calculates a prediction path that the automobile 100 will advance in. For example, the prediction path is calculated from a current vehicle speed, a steering amount, a steering direction, a rotational acceleration of the drive wheels, or the like. Alternatively, the prediction path may be calculated on the basis of information on a destination set in a navigation apparatus or the like, current location information acquired by a GPS or the like, map information, road traffic information, and the like. It should be noted that other actions of the automobile 100 may also be predicted.

The danger level judgment unit 46 judges a danger level on the basis of the action of the target object 1 predicted by the object movement prediction unit 44, the prediction path predicted by the own-vehicle movement prediction unit 45, and the like. Typically, a possibility of an accidental contact, a collision accident, or the like occurring between the pedestrian 1 or the bicycle 3 (rider 4) and the automobile 100 is judged. For example, in a case where the prediction path of the automobile 100 overlaps or comes extremely close to a point ahead (extension) of the predicted movement direction of the pedestrian 2 or the like, it is judged that the danger level is high.

Further, it is also possible to calculate the prediction path of the pedestrian 2 or the like on the basis of the predicted movement direction of the pedestrian 2 or the like, and the like and judge that the danger level is high in a case where the prediction path overlaps or comes extremely close to the prediction path of the automobile 100. The prediction path of the pedestrian 2 or the like may be calculated by the object movement prediction unit 44.

It is also possible to judge the danger level as high in a case where an abrupt acceleration of the bicycle 3 or the like is predicted and a direction of the abrupt acceleration is directed toward the prediction path of the automobile 100. It should be noted that a danger level judgment similar to that described above may be executed while setting the entire road that the automobile 100 is predicted to advance in as the prediction path.

Instead of the prediction path, the position of the automobile 100 and the position of the target object 1 at a predetermined timing in the future, typically a timing immediately after photographing, may each be predicted so as to judge the danger level.

The warning output unit 47 outputs danger avoidance information for avoiding a danger concerning the drive of the automobile 100 on the basis of the judged danger level. Specifically, information for avoiding an accidental contact or the like with the pedestrian 2 or the like is output. The danger avoidance information is output by, for example, an image, audio, or the like. The danger level judgment unit 46 and the warning output unit 47 realize an output unit of this embodiment.

[Prediction of Action of Target Object]

The prediction of the next action based on a posture will be described in detail. For example, various actions can be taken by the pedestrian 2 and the bicycle 3, such as a leftward or rightward direction change when going straight, a change to another direction during a curve action, and a change in a static/dynamic state such as a sudden acceleration and a sudden stop. A posture of the pedestrian 2 or the like at a time an action is switched, such as the direction change and sudden acceleration described above, that is, immediately before starting the next action, will be verified. In addition, features related to postures when switching to the next action are extracted for the various actions, to thus realize the action prediction of this embodiment.

Thus, the inventors of the present invention focused on the barycenter point 55 of the target object 1 and the grounding point 56 as the contact point with the road surface R. Specifically, it was found that at a time of a switch to the next action, the position of the barycenter point 55 and the relative positional relationship between the barycenter point 55 and the grounding point 56 change. By extracting the change in the position of the barycenter point 55 or the like as a feature related to a posture at the time of a switch to the next action, the action prediction according to the present technology described below was devised.

Figure 5:
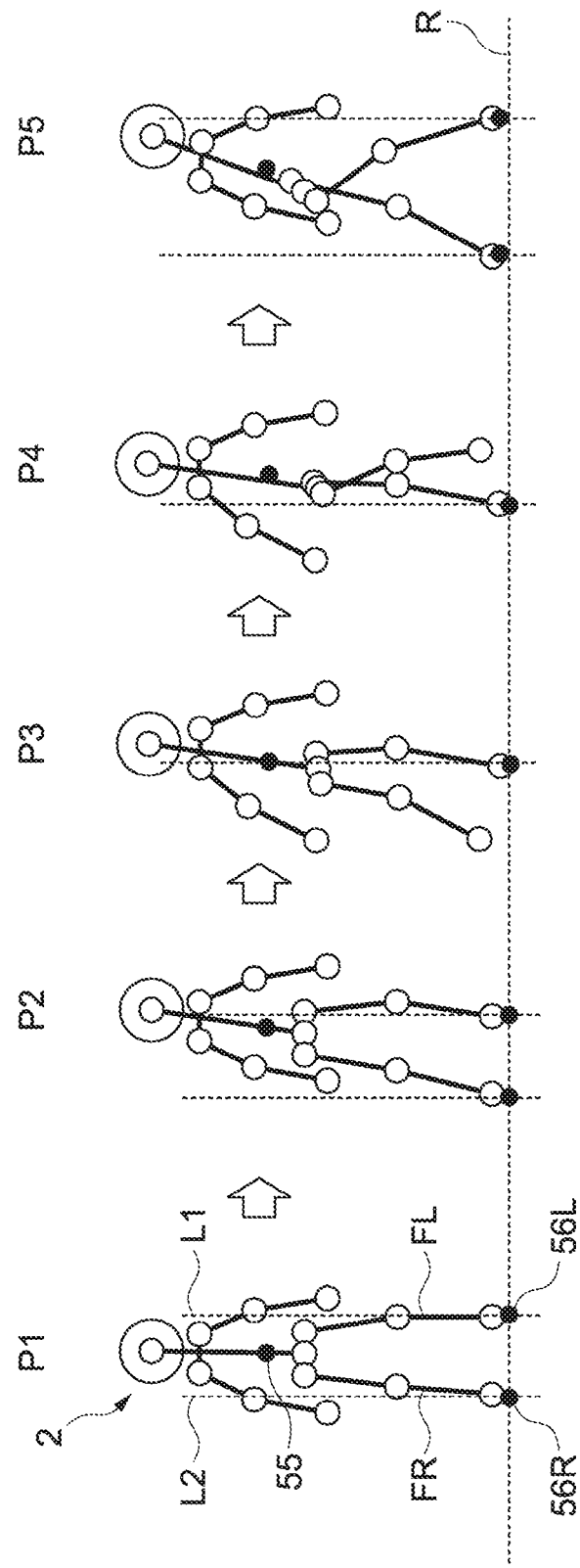
FIG. 5 A schematic diagram showing postures (frameworks) at a time a pedestrian in a still state starts to walk in a predetermined direction (right-hand direction in figure).

FIG. 5 is a schematic diagram showing postures (frameworks) at a time the pedestrian 2 in a still state starts to walk in a predetermined direction (right-hand direction in figure). The barycenter point 55, a grounding point 56L between a left foot FL and the road surface R, and a grounding point 56R between a right foot FR and the road surface R are calculated in each posture. It should be noted that grounding point lines L1 and L2 are set in a vertical direction from the grounding points 56L and 56R, respectively.

P1 in FIG. 5 shows a state where the pedestrian 2 stands still on both feet. P5 in FIG. 5 shows a state where the right foot FR (rear-side foot regarding movement direction) moves one step forward, that is, a state where walking starts. P2 to P4 in FIG. 5 show postures during a switch from the still state to the walking state, that is, postures right before starting to walk.

In P1 of FIG. 5, the barycenter point 55 is included in an area between the grounding point lines L1 and L2. It should be noted that the position on the grounding point line L1 and the position on the grounding point line L2 are also within the area described above. In P2, the barycenter point 55 moves toward the right-hand side, that is, in a walking direction, in the area between the grounding point lines L1 and L2. In P3, the right foot FR (rear-side foot) is raised, and thus there is one grounding point 56. The barycenter point 55 is positioned substantially above the grounding point 56L of the left foot FL (front-side leg), that is, on the grounding point line L1.

In P4 of FIG. 5, the weight moves as the right foot FR moves in the movement direction, and the barycenter point 55 moves more on the right-hand side (front side) than the grounding point line L1. In P5, the right foot FR takes a step forward, and the barycenter point 55 is thus included in the area between the grounding point lines L1 and L2.

Figure 6A:
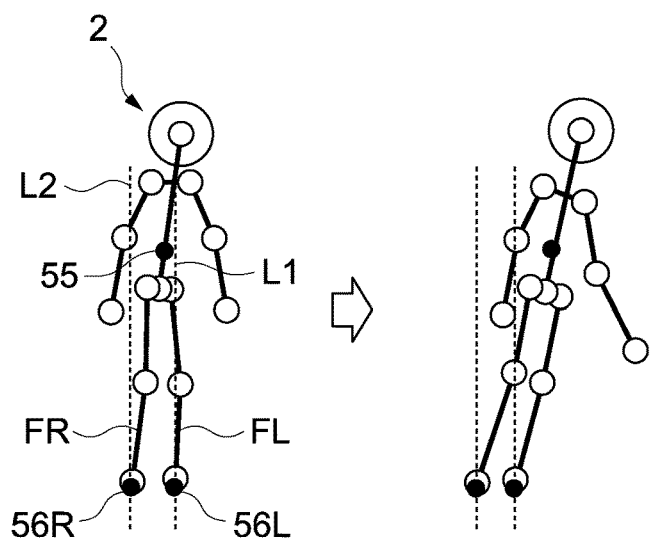
FIGS. 6A, 6B, and 6C Schematic diagrams showing postures of other patterns when starting to walk from the still state.
Figure 6B:
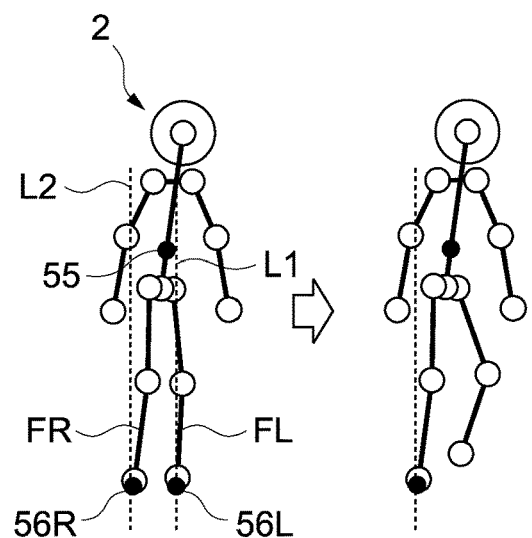
Figure 6C:
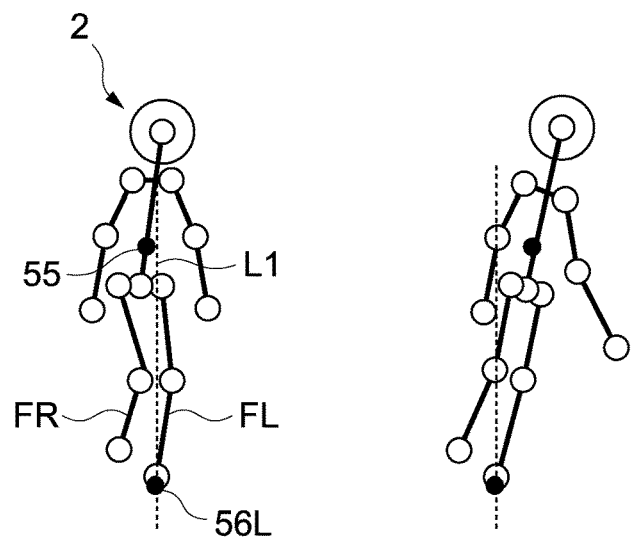

FIGS. 6A, 6B, and 6C are schematic diagrams showing postures of other patterns when starting to walk from the still state. FIG. 6A is a diagram showing a case where the posture is tilted in the movement direction (right-hand direction in figure) from the state of standing on both feet, and the barycenter point 55 is moved out of the area between the grounding point lines L1 and L2 on the right-hand side. In other words, the barycenter point 55 is deviated from the area between the grounding point lines L1 and L2 in the movement direction.

FIG. 6B is a diagram showing a case where the left foot (front-side foot) takes a step forward from the state of standing on both feet. When the left foot FL is raised from the road surface R, the number of grounding points 56 becomes one, and the barycenter point 55 is deviated to the right-hand side of the grounding point line L2.

FIG. 6C is a diagram showing a case where the posture is tilted in the movement direction (right-hand direction in figure) from a state of standing only on the left foot FL, and the barycenter point 55 moves more on the right-hand side than the grounding point line L1.

On the basis of P4 of FIG. 5 and FIGS. 6A 6B, and 6C, the inventors found the following points as the features of the posture immediately before starting to walk, regarding walking from the still state.

The number of grounding points 56 is two (state of standing on both feet), and the barycenter point 55 is deviated from the area between the grounding point lines L1 and L2. In this case, the pedestrian 2 starts to walk toward the side on which the barycenter point 55 is deviated.

The number of grounding points 56 is one (state of standing on one foot), and the barycenter point 55 is not on the grounding point line (L1 or L2) and is deviated from the grounding point line. In this case, the pedestrian 2 starts to walk toward the side on which the barycenter point 55 is deviated.

It should be noted that although the case of walking in the right-hand direction in the figure has been described in the descriptions above, the same holds true in a case of walking in the left-hand direction in the figure. Further, the present technology is not limited to the case of starting to walk from the still state, and the prediction can similarly be performed also in a case where the pedestrian 2 walking straight in a direction vertical to the paper surface turns left or right.

Figure 7:
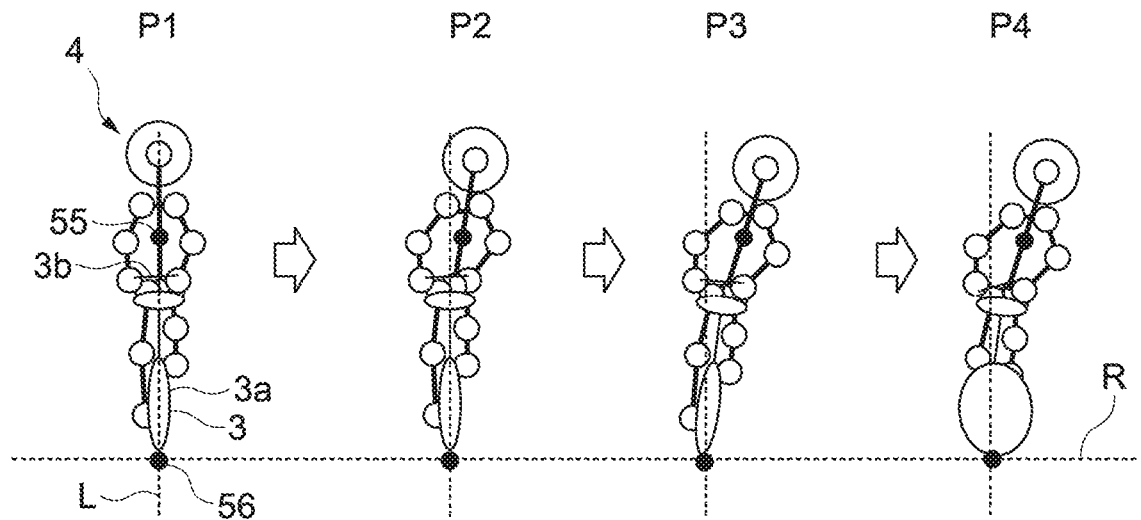
FIG. 7 A schematic diagram showing (frameworks) at a time a bicycle running straight and a rider thereof change directions in a predetermined direction (right-hand direction in figure).

FIG. 7 is a schematic diagram showing (frameworks) at a time the bicycle 3 running straight and the rider 4 thereof change directions in a predetermined direction (right-hand direction in figure). The barycenter point 55 and the grounding point 56 between a wheel 3a and the road surface R are calculated in each posture. The grounding point 56 can be calculated on the basis of, for example, an image of the bicycle 3 detected from an input image. A grounding point line L extending in the vertical direction is set from the ground point 56.

P1 of FIG. 7 shows a state where the bicycle 3 is going straight toward the front side in a direction vertical to the paper surface. P4 of FIG. 7 shows a state where a handle 3b is turned to the right-hand side, that is, the left-hand side when viewed from the rider 4, and is a state where the direction is started to be turned in the right-hand direction. P2 and P3 of FIG. 7 show postures at the time of a switch to the state where the direction is changed from the forward direction and is a posture right before turning the handle 3b.

In P1 of FIG. 7, the barycenter point 55 is substantially on the grounding point line L. From P2 to P3 in the figure, the weight moves toward the movement direction (right-hand direction in figure), and the barycenter point 55 moves more on the right-hand side than the grounding point line L. The barycenter point 55 is positioned more on the right-hand side than the grounding point line L even in a state where the handle 3b of P4 is started to be turned.

On the basis of P2 to P4 of FIG. 7, the inventors found that the barycenter point 55 is deviated from the grounding point line L in the movement direction, as a feature of the posture right before the direction change of the bicycle 3. It should be noted that the same holds true for a direction change to the left-hand direction. The direction change of the bicycle 3 traveling straight toward a back side on the paper surface can also be predicted in a similar manner.

Figure 8:
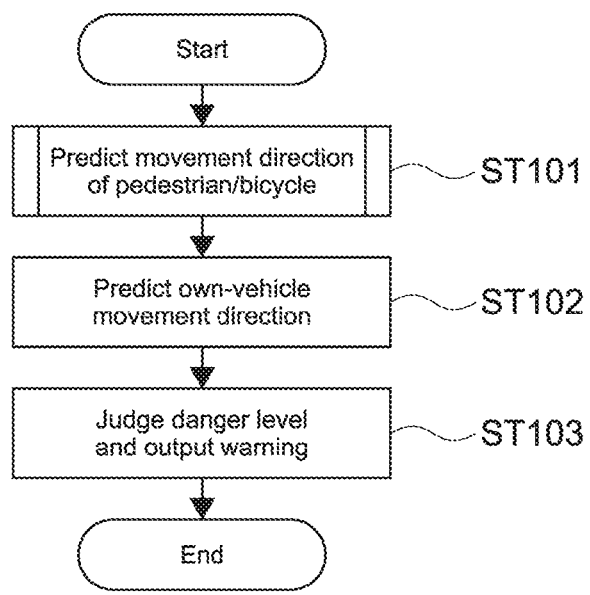
FIG. 8 A flowchart showing a processing example by the danger avoidance apparatus.

FIG. 8 is a flowchart showing a processing example by the danger avoidance apparatus 40. The movement direction of each of the pedestrian 2 and the bicycle 3 (rider 4) is predicted by the object movement prediction unit 44 (Step 101). The own-vehicle movement prediction unit 45 predicts the movement direction (prediction path) of the automatic 100 (Step 102). The danger level judgment unit 46 judges a danger level of a collision or the like, and the warning output unit 47 outputs danger avoidance information (Step 103).

Figure 9:
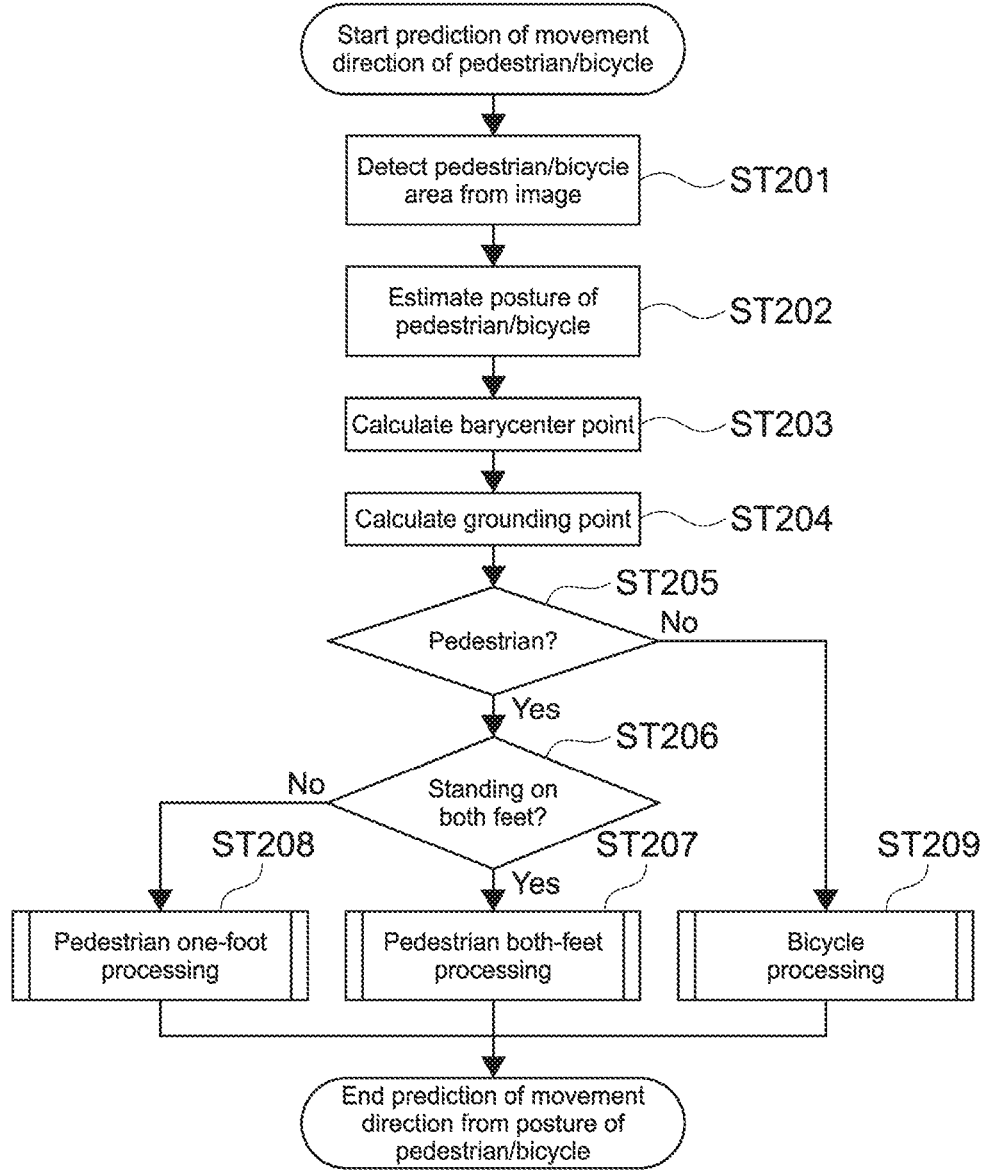
FIG. 9 A flowchart showing an example of an operation of predicting movement directions of a pedestrian and bicycle.

FIG. 9 is a flowchart showing an example of an operation of predicting movement directions of the pedestrian 2 and the bicycle 3. First, the object detection unit 42 detects each of the pedestrian 2 and the bicycle 3 (Step 201). Next, the posture estimation unit 43 estimates a posture of each of the pedestrian 2 and the bicycle 3 (Step 202).

The barycenter point 55 is calculated as a feature point of each of the pedestrian 2 and the rider 4 (Step 203). Referring to FIG. 4, coordinates of the barycenter point 55 ($x_{ave}$, $y_{ave}$) are calculated by the following expressions.

$$x_{ave} = \frac{\sum_{i=1,\ldots,N}(W_i \cdot x_i)}{W}$$

$$y_{ave} = \frac{\sum_{i=1,\ldots,N}(W_i \cdot y_i)}{W}$$

[Expression 1]

It should be noted that the parameters are as follows.
N . . . Number of parts set when estimating framework
Wi . . . Mass of each part
(xi, yi) . . . Positional coordinates of each part
W . . . Total mass of pedestrian and rider (=$W_1$+ . . . +$W_N$)

The mass Wi of each part and the total mass W are preset. For example, an average mass of each part of a human body is used. It should be noted that it is also possible to distinguish males, females, adults, children, and the like from one another and store each of the masses of the respective parts. For example, a type of the pedestrian 2 is judged from an input image, and a mass of each corresponding part is read out.

The positional coordinates of each part are calculated on the basis of a position of the part estimated by the posture estimation, and a position of the barycenter point of each part is typically used. It should be noted that the positional coordinates of each part may be calculated on the basis of positional coordinates of the white circles 51 expressing the framework. For example, a center point of the white circles 51 at joint portions at both ends of a part may be used as the positional coordinates of the part.

The contact point of the pedestrian 2 or the like with the road surface R, that is, the grounding point 56 is calculated (Step 204). For the pedestrian 2, a lowermost point of the estimated framework is calculated as the grounding point 56. For the bicycle 3, a lowermost point of the wheel 3a is calculated as the grounding point 56.

Whether the detected target object 1 is a pedestrian 2 is judged (Step 205). In a case where the target object 1 is a pedestrian 2 (Yes in Step 205), it is judged whether the pedestrian 2 is standing on both feet (Step 206), and in the case of Yes, pedestrian both-feet processing is executed (Step 207). In a case where the pedestrian 2 is standing on one foot (No in Step 206), pedestrian one-foot processing is executed (Step 208).

In a case where it is judged in Step 206 that the target object 1 is not the pedestrian 2 (No), bicycle processing is executed (Step 209).

Figure 10:
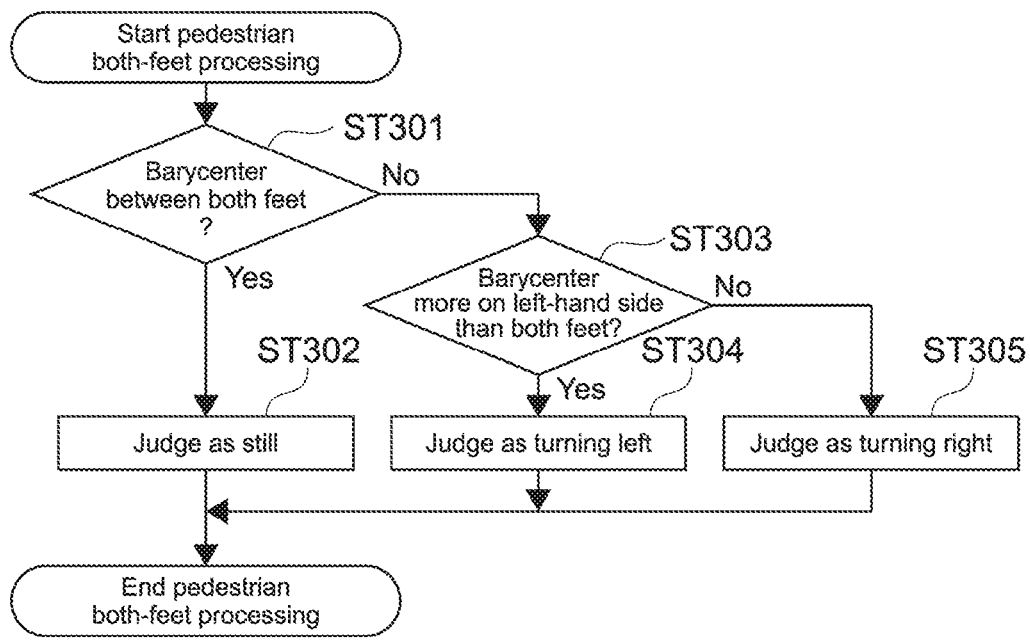
FIG. 10 A flowchart showing an example of pedestrian both-feet processing.

FIG. 10 is a flowchart showing an example of the pedestrian both-feet processing. First, it is judged whether a barycenter is between both feet, that is, whether the barycenter point 55 shown in FIG. 5 and the like is included in the area between the grounding point lines L1 and L2 (Step 301). In a case where the barycenter is between both feet (Yes in Step 301), it is judged that the pedestrian 2 is still (Step 302).

It should be noted that in a case where the pedestrian 2 is walking straight when a movement history of the pedestrian 2 can be grasped on the basis of a past input image, or the like, it may be judged that the straight movement has continued in Step 302.

If the barycenter is not between both feet (No in Step 301), it is judged whether the barycenter is on the left-hand side of both feet, that is, whether the barycenter point 55 is deviated to the left-hand side with respect to the area between the grounding point lines L1 and L2 (Step 303). In a case where the barycenter is deviated to the left-hand side (Yes in Step 303), it is judged that the pedestrian 2 will turn left (Step 304).

It should be noted that it is judged that the pedestrian 2 will turn left when seen from a direction in which the pedestrian 2 is photographed by the front camera 11, that is, in front view of the automobile 100. In a case where the pedestrian 2 is walking toward the automobile 100 side, the pedestrian 2 him/herself will turn right.

In a case where the barycenter is deviated to the right-hand side (No in Step 303), it is judged that the pedestrian 2 will turn right (Step 305). In other words, it is judged that the pedestrian 2 will turn right in the front view of the automobile 100.

The processing described above becomes as follows when expressed using coordinates.

In the case of $x_{ground\_r} \leq x_{ave} \leq x_{ground\_l}$, it is judged as a still state In the case of $x_{ave} < x_{ground\_r}$, it is judged as moving in the left-hand direction In the case of $x_{ave} > x_{ground\_l}$, it is judged as moving in the right-hand direction It should be noted that $x_{ground\_l}$ and $x_{ground\_r}$ are x coordinates of the grounding points 56L and 56R of both feet, respectively.

Figure 11:
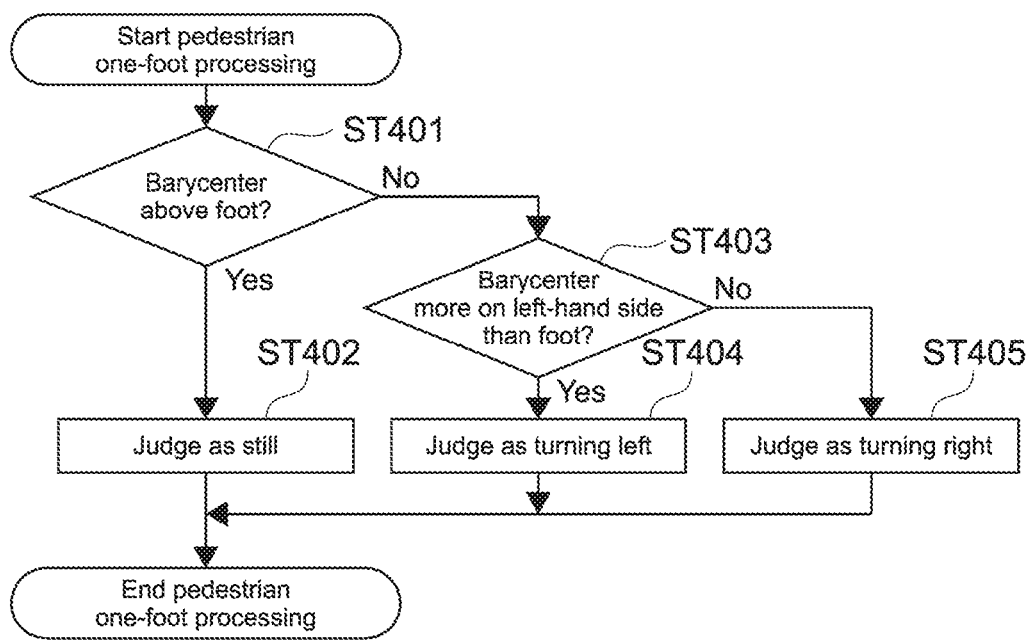
FIG. 11 A flowchart showing an example of pedestrian one-foot processing.

FIG. 11 is a flowchart showing an example of the pedestrian one-foot processing. First, it is judged whether the barycenter is above a foot on the road surface R, that is, whether the barycenter point 55 shown in FIG. 5 and the like is on the grounding point line (L1 or L2) (Step 401). It should be noted that the present invention is not limited to the case where the barycenter point 55 is strictly positioned on the grounding point line, and it is also possible to judge that the barycenter is above a foot in a case where the barycenter is close to the grounding point line.

For example, a grounding point area that includes a predetermined width (size in x direction) and extends in a y-axis direction about the grounding point line is set. It is judged that the barycenter is above the foot in a case where the barycenter point 55 is included in the grounding point area.

In a case where the barycenter is above the foot (Yes in Step 401), it is judged that the pedestrian 2 is still (Step 402). In a case where the barycenter is not above the foot (No in Step 401), it is judged whether the barycenter is on the left-hand side of the foot on the ground, that is, whether the barycenter point 55 is deviated to the left-hand side with respect to the grounding point line (or grounding point area) (Step 403). In a case where the barycenter is deviated to the left-hand side (Yes in Step 403), it is judged that the pedestrian 2 will turn left (Step 404). In a case where the barycenter is deviated to the right-hand side (No in Step 403), it is judged that the pedestrian 2 will turn right (Step 405).

The processing described above becomes as follows when expressed using coordinates.

In the case of $x_{ave} = X_{ground}$, it is judged as a still state

In the case of $x_{ave} < X_{ground}$, it is judged as moving in the left-hand direction In the case of $x_{ave} > X_{ground}$, it is judged as moving in the right-hand direction It should be noted that $x_{ground}$ is an x coordinate of the one-foot grounding point (56L or 56R). Further, in a case where the grounding point area is set, the judgment is executed using a minimum x coordinate and a maximum x coordinate of the grounding point area as a reference.

Figure 12:
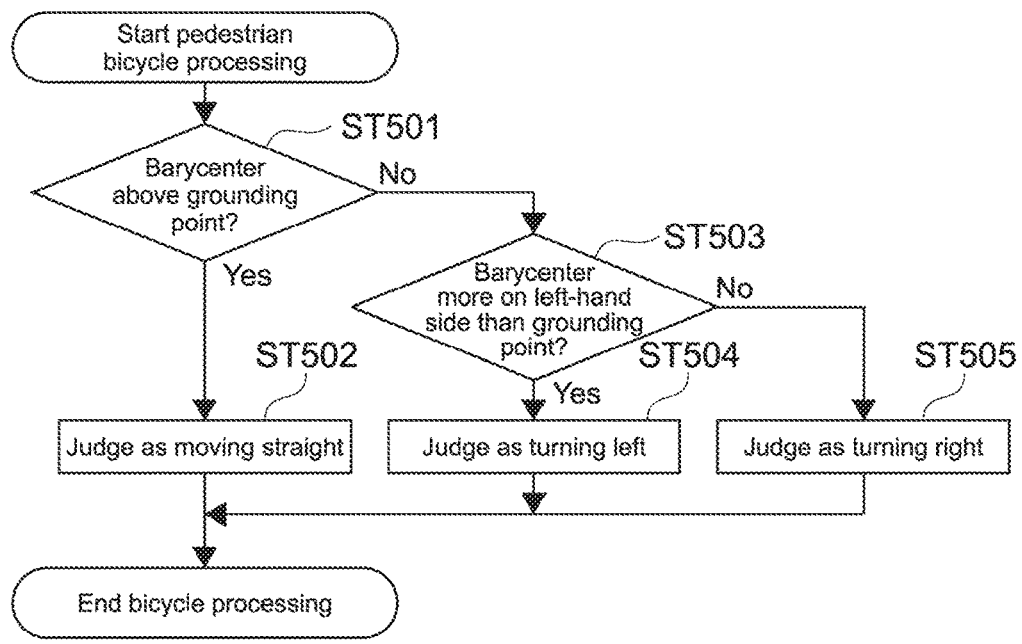
FIG. 12 A flowchart showing an example of bicycle processing.

FIG. 12 is a flowchart showing an example of the bicycle processing. First, it is judged whether the barycenter is above the grounding point 56 of the wheel, that is, whether the barycenter point 55 shown in FIG. 7 and the like is on the grounding point line L (Step 501). It should be noted that the present invention is not limited to the case where the barycenter point 55 is strictly positioned on the grounding point line L, and it is also possible to judge that the barycenter is above the grounding point 56 in a case where the barycenter is close to the grounding point line L. In other words, the grounding point area described above may be set.

In a case where the barycenter is above the grounding point (Yes in Step 501), it is judged that the bicycle 3 is running straight (Step 502). In a case where the barycenter is not above the grounding point 56 (No in Step 501), it is judged whether the barycenter is on the left-hand side of the grounding point 56, that is, whether the barycenter point 55 is deviated to the left-hand side with respect to the grounding point line L1 (or grounding point area) (Step 503). In a case where the barycenter is deviated to the left-hand side (Yes in Step 503), it is judged that the bicycle 3 will turn left (Step 504). In a case where the barycenter is deviated to the right-hand side (No in Step 503), it is judged that the bicycle 3 will turn right (Step 505).

The processing described above becomes as follows when expressed using coordinates.

In the case of $x_{ave} = X_{ground}$, it is judged as a still state

In the case of $X_{ave} < x_{ground}$, it is judged as moving in the left-hand direction In the case of $X_{ave} > x_{ground}$, it is judged as moving in the right-hand direction It should be noted that $x_{ground}$ is an x coordinate of the wheel grounding point 56. Further, in a case where the grounding point area is set, the judgment is executed using a minimum x coordinate and a maximum x coordinate of the grounding point area as a reference.

By focusing on the position of the barycenter point 55 of the target object 1 and the relative positional relationship between the barycenter point 55 and the grounding point 56 in this way, it is possible to easily and highly accurately predict an action of the target object 1.

Figure 13:
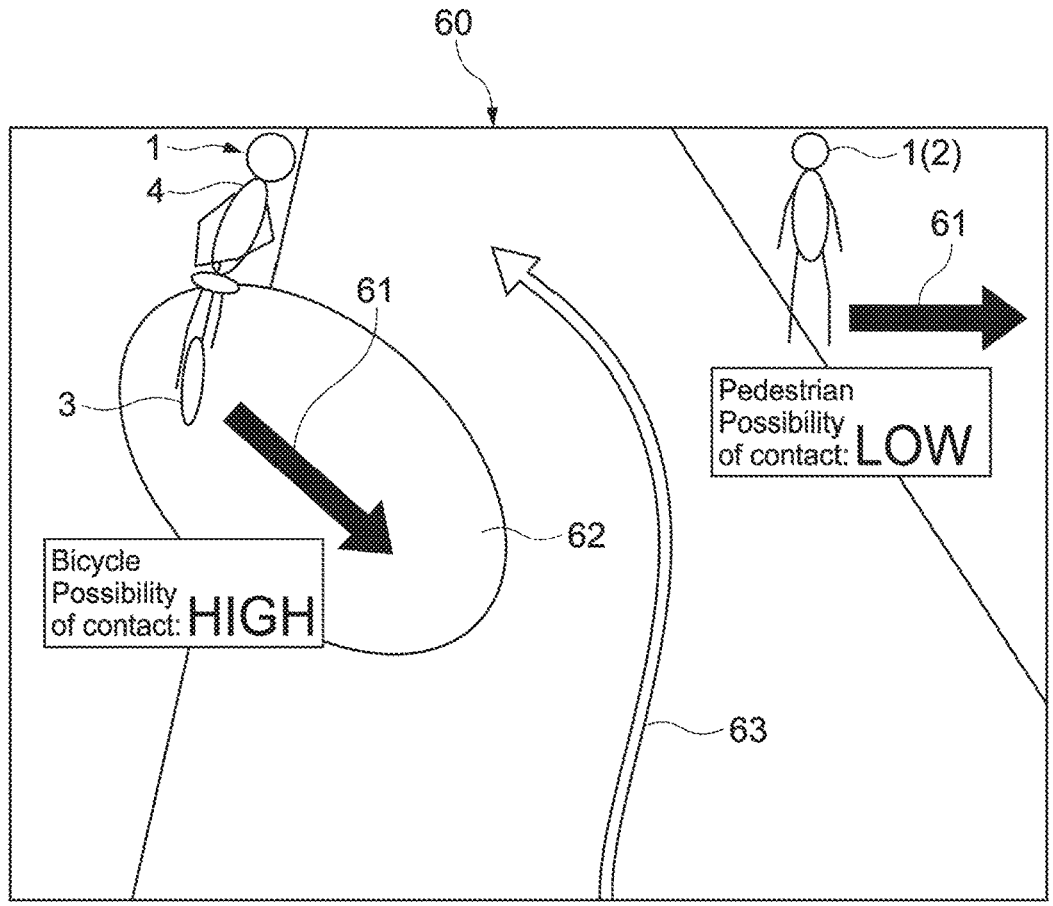
FIG. 13 A diagram showing an example of a danger avoidance image output by a warning output unit.

FIG. 13 is a diagram showing an example of a danger avoidance image as the danger avoidance information output by the warning output unit 47. In a danger avoidance image 60, a type of each target object 1 (pedestrian 2/bicycle 3), a possibility of contact with each target object 1, a movement direction 61 of each target object 1, a dangerous area 62 where there is a possibility of contact, and a danger avoidance path 63 are displayed.

In the example shown in FIG. 13, an oblique lower-right direction is displayed as the movement direction 61 of the bicycle 3 and the rider 4 thereof. For example, not only the horizontal direction like the movement direction 61 of the pedestrian 2 but also an oblique direction may be calculated as the movement direction 61. For example, a specific movement direction can be calculated on the basis of the position of the barycenter point 55, the direction of the wheel, and the like.

It should be noted that the direction of the wheel can be calculated from an input image. Further, it is also possible to calculate it by the framework estimation of the bicycle 3 to be described later. Moreover, a movement history of the bicycle that can be calculated on the basis of past input images may be used as appropriate.

The dangerous area 62 is an area where there is a possibility of coming into contact with the automobile 100 in a case where the bicycle 3 or the like moves along the predicted movement direction 61. For example, the size of the dangerous area 62 is preset for each of the pedestrian 2 and the bicycle 3, and the dangerous area 62 is set about the bicycle 3 and the like. Alternatively, the dangerous area 62 may be dynamically set on the basis of a prediction of a movement speed, acceleration, and the like of the bicycle 3 and the like.

The danger avoidance path 63 is an image that shows a route for avoiding the dangerous area 62 displayed for each target object 1 with which it may collide. For example, a safe avoidance path 63 is calculated using a prediction path predicted by the own-vehicle movement prediction unit 45 as a reference. For calculating the danger avoidance path 63, navigation information, current location information, road information, or the like may be used as appropriate.

By displaying the danger avoidance image 60, it becomes possible to cause the driver of the automobile 100 to pay attention to the bicycle 3 or the like with which it may collide, and prevent an accidental contact and the like from occurring. Further, by displaying the dangerous area 62 and the danger avoidance path 63, the driver can easily grasp a safe path and the like. It should be noted that the driver may be notified of the movement direction of each target object 1, the possibility of contact, the danger avoidance path 63, and the like by audio.

As described above, in the danger avoidance apparatus 40 of this embodiment, actions of the pedestrian 2 and the bicycle 3 (rider 4) can be highly accurately predicted on the basis of estimated postures. Accordingly, it becomes possible to provide effective danger avoidance information for preventing an accident and the like to the driver of the automobile 100 and the like and thus raise caution. As a result, even in a case where a sudden change in the direction or the like occurs, for example, regarding the pedestrian 2 or the bicycle 3, an accidental contact or the like can be prevented from occurring.

Other Embodiments

The present technology is not limited to the embodiment described above, and various other embodiments can be realized.

For example, in the descriptions above, the prediction of a next action based on an estimated posture has been described while taking the direction change to the left and right as an example. The present technology is not limited to this, and the action prediction may be performed while focusing on the position of the barycenter point and the relative positional relationship between the barycenter point and the grounding point in various actions.

Figure 14:
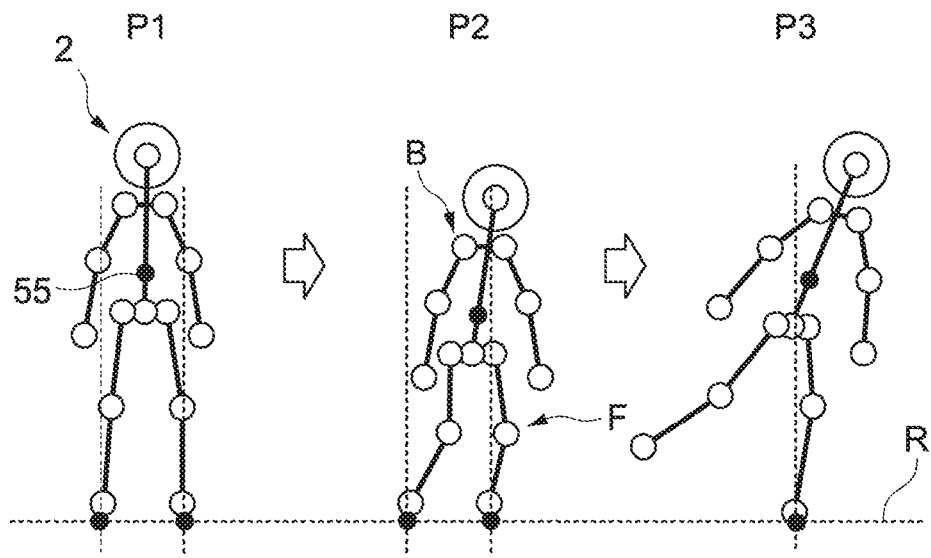
FIG. 14 A diagram for explaining another embodiment of the action prediction.

FIG. 14 is a diagram for explaining another embodiment of the action prediction. For example, in a case where the pedestrian 2 or the like suddenly accelerates, a barycenter of a body is lowered before the sudden acceleration, and the body crouches in many cases. Specifically, the barycenter point 55 is lowered downwardly as shown in P1 and P2 of FIG. 14, and suddenly accelerates at once in P3. Focusing on a feature of the posture before this sudden acceleration, in a case where the barycenter point 55 is lowered, it is predicted that a sudden acceleration will be performed.

For judging that the barycenter is being lowered, a position of a framework of a leg portion F or a back portion B may be judged in place of or in addition to the position of the barycenter point 55. Specifically, whether a leg is bent or a back is bent to crouch the body may be judged. By judging in combination with the rightward and leftward movements of the barycenter point 55, it is also possible to predict a direction of the sudden acceleration. As a result, it becomes possible to prevent an accidental contact with the pedestrian 2, the bicycle 3, and the like, that start to run suddenly, from occurring.

Further, a tilt angle of a straight line connecting the barycenter point 55 and the grounding point 56 with respect to the road surface R may be calculated. The tilt angle θ can be calculated using, for example, the coordinates $(X_{ave}, y_{ave})$ of the center point 55 and the coordinates $(x_{ground}, y_{ground})$ of the grounding point 56. In a case where the tilt angle θ is small, it is judged that the body is sufficiently tilted, and thus it can be predicted that a sudden acceleration or a sudden change of direction will be performed.

It is also possible to predict a sudden acceleration or a sudden change of direction in a case where the pedestrian 2 widely opens his/her legs.

Although already described above, it is possible to highly accurately predict an action by acquiring a history of actions of a target object from past input images and using it for predicting the next action.

Figure 15:
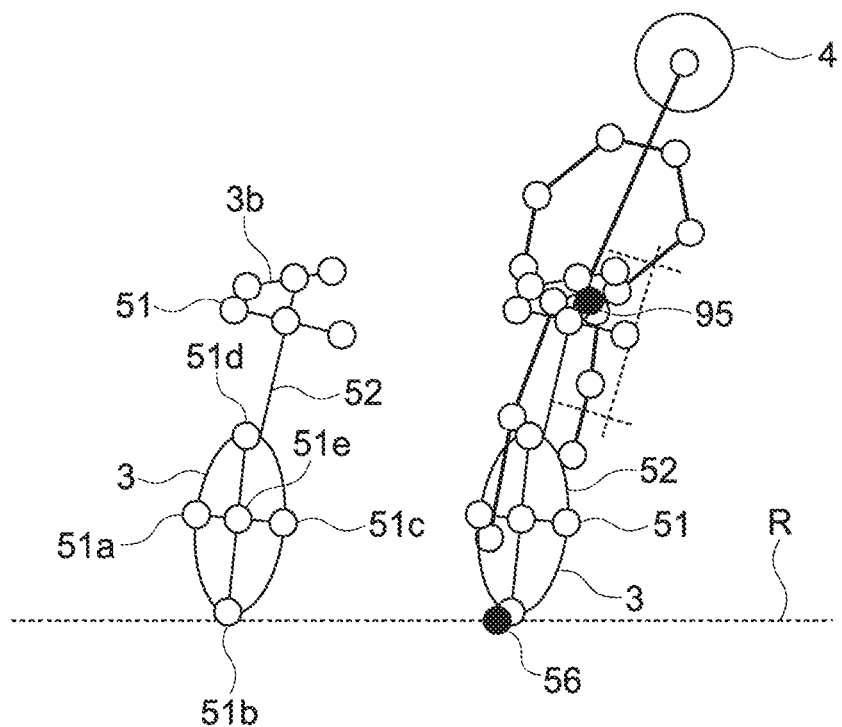
FIG. 15 A diagram for explaining another embodiment of the posture estimation of a bicycle and a rider thereof.

FIG. 15 is a diagram for explaining another embodiment of the posture estimation of the bicycle 3 and the rider 4 thereof. As shown in FIG. 15, a framework may be detected not only for the rider 4 but also for the bicycle 3. For example, a plurality of parts are preset for the bicycle 3, and a position of each part of the bicycle 3 is estimated on the basis of an input image. At this time, a technology similar to the framework estimation of the pedestrian 2, the rider 4, and the like may be used.

If the position of each part of the bicycle 3 is estimated, the white circles 51 and lines 52 preset in correspondence with the respective parts are set. Accordingly, the posture of the bicycle 3 can be estimated. It is possible to highly accurately estimate an overall posture of the bicycle 3 and the rider 4 thereof on the basis of the estimated posture of each of the bicycle 3 and the rider 4 thereof.

In predicting the next action, an overall barycenter point 95 of the bicycle 3 and the rider 4 thereof is calculated. Further, on the basis of the framework of the bicycle 3, a lowermost point thereof is detected as the grounding point 56 with the road surface R. On the basis of these barycenter point 95 and grounding point 56, an action can be predicted highly accurately. For example, it becomes possible to estimate a steering amount of the handle 3b on the basis of the white circles 51a to 51e at the wheel portion of the bicycle 3 and specifically predict a movement direction and the like. Further, an action prediction of extremely high accuracy becomes possible on the basis of the combination of the posture of the rider 4 and the posture of the bicycle 3.

In the above description, the barycenter point of the target object is calculated as a feature point for executing the action prediction. The present technology is not limited to this, and a barycenter point of a head portion or waist portion may be used as the feature point.

The action of the target object existing on the left- or right-hand side of or behind the automobile may be predicted on the basis of photographed images photographed by side cameras on left- and right-hand sides, a rear camera, and the like.

The system that includes the automobile including the various cameras such as a front camera, the sensors, the braking apparatus, and the steering apparatus and the danger avoidance apparatus according to the present technology corresponds to one embodiment of a danger avoidance system according to the present technology. Of course, the present technology is not limited to these configurations.

The present technology is applicable to not only automobiles, but also various mobile object apparatuses such as a two-wheeled vehicle and an automatic three-wheeled vehicle, and is also applicable to various technical fields such as a simulation apparatus thereof and games. Further, the present technology is applicable to not only the mobile object apparatus but also a monitoring system and the like. For example, it is possible to predict an action of a pedestrian or the like walking on a bridge, a platform, or the like and notify that person or surrounding people in a case where there is a danger of falling or the like.

At least two of the feature portions according to the present technology described above can be combined. In other words, various feature portions described in the respective embodiments may be arbitrarily combined without distinguishing the embodiments from one another. Moreover, the various effects described above are mere examples and should not be limited thereto, and other effects may also be exerted.

It should be noted that the present technology can also take the following configurations.

(1) An information processing apparatus, including:
a detection unit that detects a target object from an input image;
an estimation unit that estimates a posture of the detected target object; and
a prediction unit that predicts an action of the target object on a basis of the estimated posture.

(2) The information processing apparatus according to (1), in which
the detection unit is capable of detecting a pedestrian from the input image, and
the prediction unit predicts an action of the pedestrian on a basis of an estimated posture of the pedestrian.

(3) The information processing apparatus according to (1) or (2), in which
the detection unit is capable of detecting a two-wheeled vehicle and a rider thereof from the input image,
the estimation unit estimates at least a posture of the rider, and
the prediction unit predicts an action of the two-wheeled vehicle and the rider thereof on a basis of the estimated posture of the rider.

(4) The information processing apparatus according to (3), in which
the estimation unit estimates a posture of the two-wheeled vehicle, and
the prediction unit predicts the action of the two-wheeled vehicle and the rider thereof on a basis of the estimated posture of each of the two-wheeled vehicle and the rider thereof.

(5) The information processing apparatus according to any one of (1) to (4), in which
the prediction unit calculates a feature point related to the target object on a basis of the estimated posture, and predicts the action of the target object on a basis of a position of the calculated feature point.
(6) The information processing apparatus according to (5), in which
the feature point is a barycenter point of the target object.
(7) The information processing apparatus according to (5), in which
the detection unit is capable of detecting a two-wheeled vehicle and a rider thereof from the input image, and
the prediction unit calculates, as the feature point, a barycenter point of the rider or an overall barycenter point of the two-wheeled vehicle and the rider thereof.
(8) The information processing apparatus according to any one of (5) to (7), in which
the prediction unit calculates one or more contact points of the target object with a road surface on a basis of the estimated posture, and predicts the action on a basis of a relative positional relationship between the feature point and the one or more contact points.
(9) The information processing apparatus according to any one of (1) to (8), in which
the prediction unit predicts a movement direction of the target object.
(10) The information processing apparatus according to any one of (1) to (9), in which
the prediction unit predicts an abrupt acceleration of the target object.
(11) The information processing apparatus according to any one of (1) to (10), in which
the estimation unit estimates a framework of the detected target object.
(12) The information processing apparatus according to any one of (1) to (11), in which
the information processing apparatus is mounted on a mobile object apparatus, and
the information processing apparatus further includes
an output unit that generates and outputs danger avoidance information for avoiding a danger related to a drive of the mobile object apparatus on a basis of the predicted action of the target object.
(13) The information processing apparatus according to (12), in which
the output unit judges a possibility of the mobile object apparatus and the target object coming into contact with each other, and outputs information on the judged possibility.
(14) The information processing apparatus according to (12) or (13), in which
the prediction unit is capable of predicting a movement direction of the target object, and
the output unit outputs an image including the predicted movement direction.
(15) The information processing apparatus according to any one of (12) to (14), in which
the output unit outputs an image including a dangerous area where there is a possibility that the mobile object apparatus and the target object will come into contact with each other.

REFERENCE SIGNS LIST

R road surface
L, L1, L2 grounding point line
1 target object
2 pedestrian
3 bicycle
4 rider of bicycle
40 danger avoidance apparatus
41 image acquisition unit
42 object detection unit
43 posture estimation unit
44 object movement prediction unit
45 own-vehicle movement prediction unit
46 danger level judgment unit
47 warning output unit
55, 95 barycenter point
56, 56L, 56R grounding point
60 warning image
61 movement direction
62 dangerous area
63 danger avoidance path
100 automobile

The invention claimed is:
1. An information processing apparatus, comprising:
circuitry configured to:
  detect a target object from an input image;
  calculate at least one contact point of the detected target object with a road surface;
  set a ground line in a vertical direction from the calculated at least one contact point;
  determine a relative position of a feature point of the target object with respect to the set ground line;
  estimate a posture of the target object based on the determined relative position of the feature point of the target object; and
  predict an action of the target object based on the estimated posture.
2. The information processing apparatus according to claim 1, wherein the circuitry is further configured to:
  detect a pedestrian from the input image; and
  predict an action of the pedestrian based on an estimated posture of the pedestrian.
3. The information processing apparatus according to claim 1, wherein the circuitry is further configured to:
  detect a two-wheeled vehicle and a rider from the input image;
  estimate a posture of the rider; and
  predict an action of the two-wheeled vehicle and an action of the rider, based on the estimated posture of the rider.
4. The information processing apparatus according to claim 3, wherein the circuitry is further configured to:
  estimate a posture of the two-wheeled vehicle; and
  predict the action of the two-wheeled vehicle and the action of the rider, based on the estimated posture of each of the two-wheeled vehicle and the rider.
5. The information processing apparatus according to claim 1, wherein the feature point is a barycenter point of the target object.
6. The information processing apparatus according to claim 1, wherein the circuitry is further configured to:
  detect a two-wheeled vehicle and a rider from the input image; and
  calculate, as the feature point, one of a barycenter point of the rider or an overall barycenter point of the two-wheeled vehicle and the rider.
7. The information processing apparatus according to claim 1, wherein the circuitry is further configured to predict a movement direction of the target object.

8. The information processing apparatus according to claim 1, wherein the circuitry is further configured to predict an abrupt acceleration of the target object.

9. The information processing apparatus according to claim 1, wherein the circuitry is further configured to estimate a framework of the detected target object.

10. The information processing apparatus according to claim 1, wherein
the information processing apparatus is mounted on a mobile object apparatus, and
the circuitry is further configured to:
generate danger avoidance information, to avoid a danger related to a drive of the mobile object apparatus, based on the predicted action of the target object; and
output the generated danger avoidance information.

11. The information processing apparatus according to claim 10, wherein the circuitry is further configured to:
judge a possibility of a contact of the mobile object apparatus and the target object; and
output information on the judged possibility.

12. The information processing apparatus according to claim 10, wherein the circuitry is further configured to:
predict a movement direction of the target object; and
output an image including the predicted movement direction.

13. The information processing apparatus according to claim 10, wherein
the circuitry is further configured to output an image including a dangerous area, and
in the dangerous area, a contact of the mobile object apparatus and the target object is possible.

14. An information processing method, comprising:
detecting a target object from an input image;
calculating at least one contact point of the detected target object with a road surface;
setting a ground line in a vertical direction from the calculated at least one contact point;
determining a relative position of a feature point of the target object with respect to the set ground line;
estimating a posture of the target object based on the determined relative position of the feature point of the target object; and
predicting an action of the target object based on the estimated posture.

15. A non-transitory computer-readable medium having stored thereon computer-executable instructions, which when executed by an information processing apparatus, cause the information processing apparatus to execute operations, the operations comprising:
detecting a target object from an input image;
calculating at least one contact point of the detected target object with a road surface;
setting a ground line in a vertical direction from the calculated at least one contact point;
determining a relative position of a feature point of the target object with respect to the set ground line;
estimating a posture of the target object based on the determined relative position of the feature point of the target object; and
predicting an action of the target object based on the estimated posture.

* * * * *